(12) United States Patent
Zavidniak

(10) Patent No.: US 7,082,296 B2
(45) Date of Patent: Jul. 25, 2006

(54) METHOD FOR SUSTAINING RADIO FREQUENCY (RF) BASED COMMUNICATIONS CONNECTIVITY DURING NETWORK OUTAGES

(75) Inventor: M. Paul Zavidniak, Irvine, CA (US)

(73) Assignee: Northrup Grumann Corporation, Los Angeles, CA (US)

( * ) Notice: Subject to any disclaimer, the term of this patent is extended or adjusted under 35 U.S.C. 154(b) by 390 days.

(21) Appl. No.: 10/125,448

(22) Filed: Apr. 19, 2002

(65) Prior Publication Data
US 2003/0199266 A1    Oct. 23, 2003

(51) Int. Cl.
H04M 1/66    (2006.01)
(52) U.S. Cl. .......................... 455/410; 455/1; 380/270
(58) Field of Classification Search ............... 455/1, 455/8–9, 63.1, 63.3, 410, 67.13
See application file for complete search history.

(56) References Cited

U.S. PATENT DOCUMENTS

| | | | |
|---|---|---|---|
| 4,009,343 A | | 2/1977 | Markey et al. |
| 5,363,402 A | | 11/1994 | Harmon |
| 5,713,075 A | | 1/1998 | Threadgill et al. |
| 5,854,899 A | * | 12/1998 | Callon et al. ............... 709/238 |
| 5,924,014 A | | 7/1999 | Vanden Heuvel et al. |
| 6,052,600 A | * | 4/2000 | Fette et al. ................. 455/509 |
| 6,064,701 A | * | 5/2000 | Tresser et al. .............. 375/285 |
| 6,130,876 A | | 10/2000 | Chaudhuri |
| 6,279,113 B1 | * | 8/2001 | Vaidya ........................ 713/201 |
| 6,327,245 B1 | * | 12/2001 | Satyanarayana et al. .... 370/229 |
| 6,434,132 B1 | * | 8/2002 | Ishii et al. .................. 370/338 |
| 6,442,151 B1 | * | 8/2002 | H'mimy et al. ............ 370/333 |
| 2002/0035687 A1 | * | 3/2002 | Skantze ....................... 713/168 |
| 2002/0161923 A1 | * | 10/2002 | Foster et al. ................ 709/239 |
| 2002/0197978 A1 | * | 12/2002 | Zavidniak ................... 455/410 |

FOREIGN PATENT DOCUMENTS

GB    2333672 A  *  7/1999

* cited by examiner

Primary Examiner—Jean Gelin
Assistant Examiner—Brandon J. Miller
(74) Attorney, Agent, or Firm—Buchanan Ingersoll

(57) ABSTRACT

A method and system are disclosed for ensuring data availability for a plurality of programmable radios that are waveform agile and that are capable of operating over a plurality of different data links. An enterprise network management tool makes a determination of the threat states for each waveform supported on the programmable radios, and the enterprise network management tool communicates with the programmable radios to advise the programmable radios that a waveform has been compromised. The threat states determined by the enterprise management tool are used to identify which channels are available for dynamic reassignment and which are not. The identity of the available channels and the comprised channels are communicated to a gateway. The gateway establishes a plurality of virtual networks for the programmable radios, and the gateway transitions a programmable radio from one virtual network to another, when service has been denied on the intended delivery path that has been compromised.

15 Claims, 6 Drawing Sheets

METHOD FOR SUSTAINING RADIO FREQUENCY (RF) BASED COMMUNICATIONS CONNECTIVITY DURING NETWORK OUTAGES

BACKGROUND OF THE INVENTION

1. Field of the Invention

The present invention employs radio frequency (RF) intrusion detection awareness (e.g. evidence of jamming and compromise) and communications gateways as a means to initiate and enable the transition of data from compromised radio channels to available radio channels in legacy or software-defined (programmable) radios. Communications gateways, cued by RF-based intrusion detection systems, can facilitate the transition of data across waveforms, and in doing so; sustain communications connectivity in spite of network outages (whether intended or accidental) occurring on the intended delivery path.

2. Description of the Related Art

Historically, the US military has solicited and procured radio systems designed to meet specific community-of-interest requirements. Generally, this has resulted in radios that perform specialized functions for specific service branches. As a result, service interoperability (across radios) has suffered and communications robustness has been compromised by radios that represent single points of failure. To compensate for these deficiencies the military has solicited requirements for software-defined (programmable) radios. These radios are designed to function more like computers than radios in the sense that waveform handling will be digitized and the waveforms (as well as waveform handling and processing) are software utilities that reside in the radio core (in a manner not dissimilar from utilities in a computers operating system). These new radios are also scalable in that they may represent a base-station, a handheld radio, or anything in between. When configured as a base-station, it will be possible to dynamically reconfigure or reallocate radio channels based on user demand. The limiting factor to radio availability and robustness will no longer be the 'radio hardware items;' rather it will be the availability of the transmitter and antenna elements of the new multi-waveform capable software radios.

Looking to the future, one of the envisioned software-defined radios is the Joint Tactical Radio System (JTRS). The JTRS is envisioned to be a family of affordable, high-capacity tactical radios that will cover an operating spectrum from 2 to 2000 MHz and will be capable of transmitting voice, data and video. By building upon a common architecture, JTRS will be a family of radios that are interoperable, affordable and scaleable. Also, by building on a common open architecture it is thought that the JTRS will improve interoperability by providing the ability to share waveform software between radios, including radios in different physical domains. The JTRS vision is to migrate all legacy systems (typically single band, single mode radios with little or no networking capability) into the JTRS open system architecture. In concept, JTRS is designed to alleviate both the complex solutions necessary to support network integration as well as the interoperability shortfalls associated with employing proprietary baseline systems.

In the move towards software-defined radio such as JTRS (as well as the Navy's Digital Modular Radio and the Army's Near-Term Digital Radio) the DoD seeks to unburden itself from a number of limiting constraints. Among these constraints are complex network management schemes that inhibit support and operations of fixed data rate channels that waste capacity when not needed and lack the ability to provide additional bandwidth when necessary. The DoD, therefore, is not looking to transition the capability and utility of existing network management systems that are so fundamentally important to the daily operation of these legacy radios. The data that these systems provide to operators include (but are certainly not limited to) network performance-to-specifications, throughput calculations, violations of network design, identification of unauthorized participants, excessive Reed-Solomon erasures or other errors (evidence of noise and interference) and equipment failures that, in some cases, contribute to a complete loss of network connectivity.

A commonly owned pending patent application Ser. No. 09/833,634, filed Apr. 13, 2001, and entitled "Methodology for the Detection of Intrusions into Radio Frequency (RF) Based Networks Including Tactical Data Links and the Tactical Internet," asserts that a solid comprehension of wireless network behavior through effective Quality of Service (QoS) and network management is key to recognizing adversary Radio Electronic Combat activity (comprised of both jamming and compromise events). In pending patent application Ser. No. 09/833,634, which is herein incorporated by reference, it is the association of anomalous events to each other through time and across space-against the background of known "normal" behavior characterized by user and temporal patterns-that forms the basis for identifying adversary jamming and intrusive events.

Accordingly, there is a need to utilize legacy network management capabilities of either existing or proposed systems in an intrusion detection system of the type described in patent application Ser. No. 09/833,634.

SUMMARY OF INVENTION

The present invention provides the means to utilize "off-board" legacy network management capabilities in conjunction with either existing architectures or new software-defined radio architectures, such that the legacy management capabilities will provide "triggers" that will cue the dynamic assignment of new channels and also identify which channels are not available for dynamic assignment (as they have been identified as having either been jammed or compromised). Furthermore, the present invention uniquely establishes a methodology to enable the flow of information across these newly assigned channels even if the data formatting (of source and destination channels) is not compatible. Such a methodology should be viewed as "waveform agile" communications networking.

The present invention acknowledges that network management data forms the basis for determining "normal" behavior, and subsequently, for identifying anomalous events. Once these events are identified, then an action can be taken. The following table 1 summarizes these hostile events, the associated hostile intent and the potential manifestation.

TABLE 1

| Hostile Event | Hostile Intent | Potential Manifestation |
|---|---|---|
| Jamming (noise jamming) | Disruption/denial of service | Noise/Loss of communications services Appearance of poor signal quality or poor throughput levels |
| Jamming (Net jamming/ denial of service) | Negatively impact the performance of the network | Appearance of unusually high traffic levels or poor throughput level |

TABLE 1-continued

| Hostile Event | Hostile Intent | Potential Manifestation |
|---|---|---|
| Compromise (Passive eavesdropping) | Masquerade as a legitimate network participant to learn information | Duplicate participants Appearance of rogue units Duplicate participants Appearance of rogue units Excessive/improper OTARS Synchronization problems Cryptoseal failures |
| Compromise (Deception - Active transmissions) | Transmit misleading/incorrect information | Appearance of higher traffic levels (vs. profile) Faulty header structure Incorrectly formatted data Negative acknowledgments Cryptoseal failures |

The present invention provides the means to ensure data availability through waveform agility by: 1) labeling "threat states" for each waveform supported on the programmable radio; 2) using these "threat states" to identify which channels are available for dynamic reassignment and which are not; and 3) facilitating the transition of data (from a "compromised" channel to an "available" channel), for subsequent transmission to the recipient, in spite of the fact that the service has been successfully denied to the intended delivery path.

DETAILED DESCRIPTION OF THE INVENTION

Figure 1:
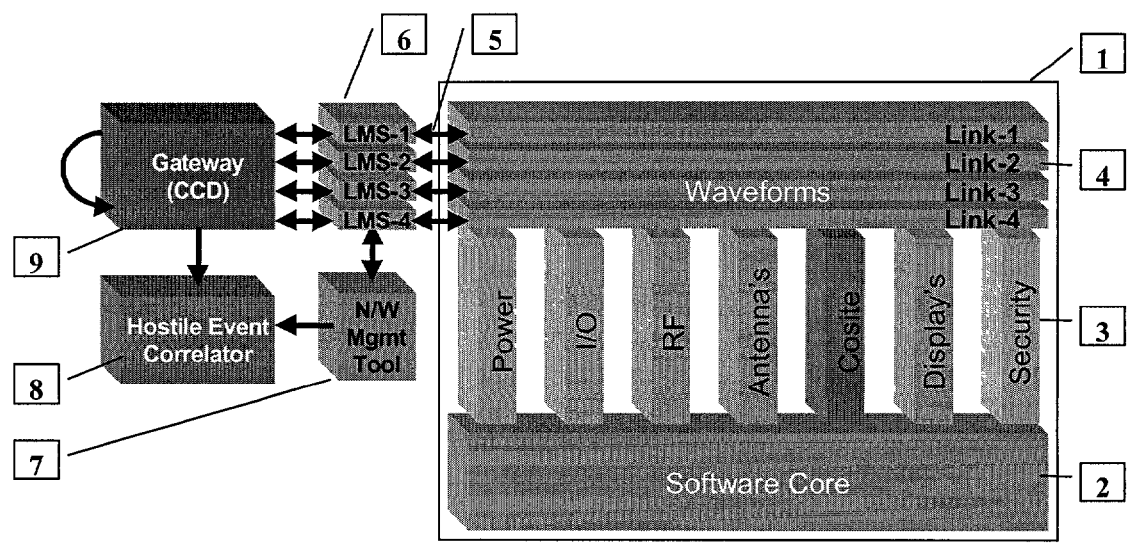
FIG. 1 represents a notional software programmable radio architecture.

The present invention is based upon the establishment of threat states across multiple waveforms supported either by existing or software defined (programmable) radios. When an adversary threat (evidence of jamming or compromise) is detected the availability status of that waveform is updated to reflect the current 'threatened' state and the message traffic may be rerouted to the intended recipient via an 'available' waveform. This will be accomplished by converting the 'threatened' data message format to the 'available' data message format and forwarding the message from the 'threatened' waveform to the 'available' waveform. In essence, the message itself is waveform independent (and waveform agile) as it is capable of being transmitted across any available waveform. This invention is applicable to a broad array of waveforms and data links that will now be explained in more specific detail. Two common RF based data links that the present invention can be applied to are the Link-11 and Link-16 tactical data links. Other applicable links include the SADL Link, Link-22, EPLRS, SINCGARS or any other legacy or future waveform providing connectivity to the warfighter.

Link-11 (also known as TADIL A in the US) employs netted communication techniques using standard message formats. Data is exchanged using the Conventional Link Eleven Waveform (CLEW) over a differential quadrature phase-shift keying modulated data link operating at a rate of 1364 (HF/UHF) or 2250 (UHF) bits per second ("bps"). Since this former—is susceptible to ECM, an addition has been the Single tone Link Eleven Waveform ("SLEW"), which disburses data bit errors uniformly utilizing data interleaving and employs Full Tail Biting Convolutional Block ("FTBCB") encoding. This greater ECM resistance provides a data rate of 1800 bps. Link-11 is designed for operation on High Frequency ("HF") ground wave and thus has a beyond line of sight ("BLOS") capability to a theoretical range of approximately 300 nautical miles ("NM"). Link-11 can also operate in the UHF band but is then limited to LOS ranges of approximately 25 NM surface-to-surface or 150 NM surface-to-air. Units, which exchange data via Link-11 are designated Participating Units ("PUs") or Forwarding Participating Units ("FPUs"). Link-11 is based on 1960s technology and is a relatively slow link that normally operates on a polling system with a net control station polling each participant in turn for their data. In addition to this "Roll Call" mode, Link-11 may be operated in broadcast modes in which a single data transmission or a series of single transmissions is made by one participant. Link-11 is, therefore, a half-duplex link. Link-11 is secure but not ECM-resistant. Link-11 supports the exchange of air, surface and subsurface tracks, EW data and limited command data among C2 units, but it does not support aircraft control or other warfare areas.

Link-16 uses the principle of Time Division Multiple Access (TDMA), an automatic function of the JTIDS terminal. The TDMA architecture uses time interlacing to provide multiple and apparently simultaneous communications nets. All JTIDS Units, or JUs, are preassigned sets of time slots in which to transmit their data and in which to receive data from other units. Multiple nets can be "stacked" by allowing time slots to be used redundantly, with the data transmitted in each net on different frequencies. There are 51 frequencies available for JTIDS transmissions. The frequency is not held constant during the time slot but is changed rapidly (every 13 microseconds) according to a predetermined pseudo-random pattern. This technique is called frequency hopping. Each net is assigned a number which designates a particular hopping pattern. Link-16 is the tactical data link of choice for the Department of Defense. Link-16 does not significantly change the basic concepts of tactical data link information exchange supported for many years by Link-11 and Link-4A (to support the Command, Control, Communications, and Intelligence function in multi-service and Navy battle group operations). Rather, Link-16 provides technical and operational improvements to existing tactical data link capabilities.

The methodology of the present invention, as applied to RF based tactical data links such as Link-11 and Link-16, their logical extensions, and other datalinks and waveforms, employs the identification of hostile adversary events as a queuing mechanism towards an adaptive response designed to ensure the flow of information to the warfighter. Referring to FIG. 1, a notional software radio architecture 1 is depicted. The architecture consists of the radio's software core 2, various indicated control channels 3 (to facilitate transmission and reception, antenna assignment, power input, co-site mitigation, security, operator displays to name but a few) and multiple waveforms 4 (for illustration purposes only four waveforms are depicted). These waveforms 4 (referred to as Links 1–4) are uniformly supported by the previous indicated control channels 3. In practice there are no limits to the amount of waveforms 4 handled.

To manage each of the unique waveforms 4 represented (Links 1–4) control channel functionality is expanded 5 to address access to the legacy network management systems 6 associated with each of the unique waveforms 4. It should be reinforced that these legacy network management systems 6 are not a component of the software radio 1. Rather, they are legacy standalone hardware/software products that (independent of the software radio) provide a network management and monitoring capability of the specific waveform 4 to the radio/waveforms operator). The previously identified patent application "Methodology for the Detection of Intrusions into Radio Frequency (RF) Based Networks Including Tactical Data Links and the Tactical Internet" asserts that it is possible to utilize these network management capabilities to recognize adversary Radio Electronic Combat activity (comprised of both jamming and compromise events).

The Enterprise Network Management Tool 7 represents a means to look across all active waveforms 4 in order to determine the threat state of any one waveform. An example of a Network Management Tool is the Joint Interface Control Officer (JICO) concept, which is a mix of specially trained personnel, hardware, software and unique informational organization, orchestrates the constant flow of incoming and outgoing ISR information across the military's many communication pipelines. The JICO concept effectively and efficiently connects the dozens of different service-unique tactical data link systems and then manages, prioritizes and translates the massive flow of ISR information. Employment of the concept simplifies and drastically speeds the process that allows air, sea and ground forces to receive time-critical targeting, situational awareness and intelligence information required for rapid, decisive operations.

The Enterprise Network Management Tool 7, therefore, represents the enabling capability to advise the radio software core 2, that a specific waveform 4 is unavailable (as it is either jammed or compromised) and initiates the process of finding another available waveform 4 to support the ensured transmission of data to the end user. In doing so, the Enterprise Network Management Tool provides the input to the software programmable radio that enables the radio to make intelligent decisions about which waveforms 4 should be deactivated and which waveforms 4 should be assigned as replacements. The present invention uniquely addresses the determination of adversary threat (versus other performance parameters) and actions taken to sustain communications in the face of that threat.

TABLE 2

Potential Indicators of Intrusive Events

| Hostile Event | Potential Manifestation | Intent Indicator |
|---|---|---|
| Jamming (noise jamming) | Noise/Loss of communications services | Examination of the communications signal itself. In particular the presence of jamming noise is indicated by a rise in Reed-Solomon erasures. If these erasures are sudden, and not associated with the performance of the relay or other friendly participants then the event may be construed as intentful |
| Jamming (Net jamming/denial of service) | Appearance of unusually high traffic levels | Utilization of assigned and/or historic traffic profiles to current levels to ascertain deviations from expected norms |
| | Duplicate participants | The appearance of more than participant with the same identification number |
| | Appearance of rogue units | The appearance of a participant that has not been previously defined/declared |

TABLE 2-continued

Potential Indicators of Intrusive Events

| Hostile Event | Potential Manifestation | Intent Indicator |
|---|---|---|
| Compromise (Passive eavesdropping) | Duplicate participants | The appearance of more than participant with the same identification number |
| | Rogue units | The appearance of a participant that has not been previously defined/declared |
| | Excessive Over The Air Re-key requests (OTARS) | Appearance indicates a unit trying to "break into" an established network |
| | False synchronizations | Appearance indicates a unit trying to "break into" an established network |
| | Cryptoseal failures | Appearance indicates an improperly keyed unit trying to "break into" an established network |
| Compromise (Deception - Active transmissions) | Appearance of higher traffic levels (vs. profile) | Appearance potentially indicates an adversary denial of service attack, or an attack designed to negatively impact performance of the network |
| | Faulty header structure | Potentially indicates a hostile transmission wherein the attacker has not properly constructed the transmission header |
| | Incorrectly formatted data | Potentially indicates a hostile transmission wherein the attacker has improperly formatted the data for transmission |
| | Negative acknowledgments | Indicates that a unit has dropped out of the communications network, or that a fictitious unit has been configured into the network with the intent of degrading network performance |
| | Cryptoseal failures | Appearance indicates an improperly keyed unit trying to "break into" an established network |

Table 2 (above) uniquely associates some manifestations of network behavior to potential intent indicators as a means to derive adversary threat. In addition to cueing the software core 2, about the presence of adversary threat, the Enterprise Network Management Tool also informs the Hostile Event Correlator 8 of this status in order to derive and subsequently update an adversary Electronic Order of Battle (EOB) for the RF spectrum addressed by the waveforms 4. The end product of the present invention (waveform agility) is achieved through the employment of a communications gateway 9. As used in the present invention, the term communications gateway refers not to a specific manufacturers product, but rather to the general employment of hardware and software to enable users to communicate across and among tactical data link systems and waveforms 4. Typically, this is accomplished by message exchange capabilities facilitated through the utilization of a number of hardware interfaces, network interfaces, and protocol interfaces designed to ensure the exchange of messages across a variety of networks and media.

For the purposes of the present invention, a "gateway" is defined as " . . . a network node equipped for interfacing with another network that uses different protocols" It should be noted that a gateway may contain devices such as protocol translators, impedance matching devices, rate converters, fault isolators, or signal translators as necessary to provide system interoperability]. (Federal Standard 1037C—Glossary of Telecommunications Terms; General Services Administration, Information Technology Service; Aug. 7, 1996). The term "gateway" has also been defined more simply as "the interconnection between networks which provides a path for the transfer of data between them (J. Feather and P. Sturges (e.d.). *International encyclopedia of Information and Library Science*. London: Routledge, 1997).

Figure 2:
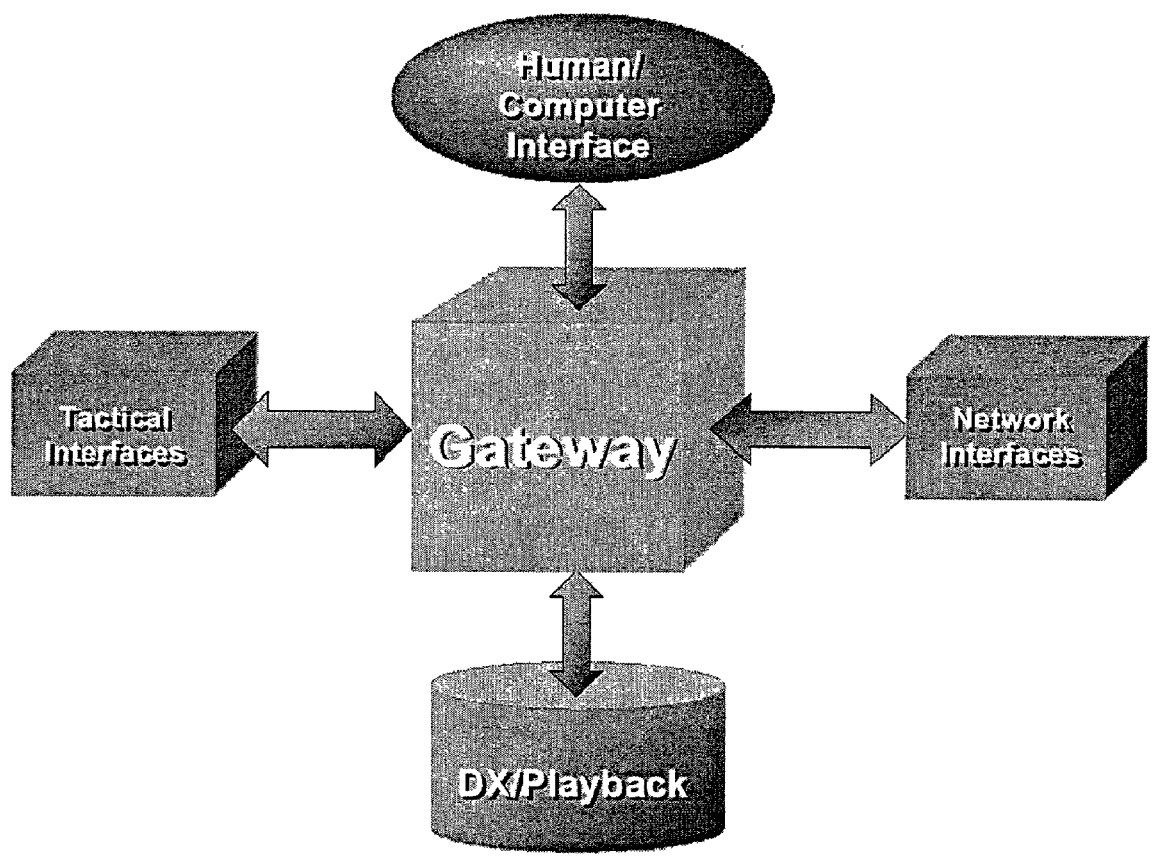
FIG. 2 represents a typical communications gateway architecture.

As represented in FIG. 2, the flexible design of the communications gateways 9 architecture enables users to connect a nearly infinite number of combinations of data link systems and waveforms 4 to achieve the desired level of system interoperability. In FIG. 2, the tactical interfaces could include the data links identified above. An example might be the internetworking of Link-11 (TADIL-A), Link-16 (JTIDS) and the Cooperative Exchange Capability (CEC) together in an interoperable environment. Of course, this methodology is not restricted to these links, as it incorporates the indicated links, their logical extensions (Link-11 and Link-16 derivatives), and other datalinks (i.e.; SADL, Link-22, EPLRS, SINCGARS to name just a few) and waveforms whether existing or envisioned. An example of a gateway application is the US Navy's Data Link Gateway (DLGW) System. Examples of tactical networks and their interfaces could include JTIDS: 1553, X.25, STJ; TADIL A: NTDS, ATDS; and CEC: USG-1,USG-2. Examples of the Network Interfaces could include LAN protocols RS-232 and RS-449, as well as other network intefaces such as ABN-16, ABN-11, SIMPLE, DTSS-16. A DX/Playpack feature allows message traffic to be stored and replayed (DX=Data extraction) facilitating either post mission analysis or traffic generation for simulation purposes.

Figure 3A:
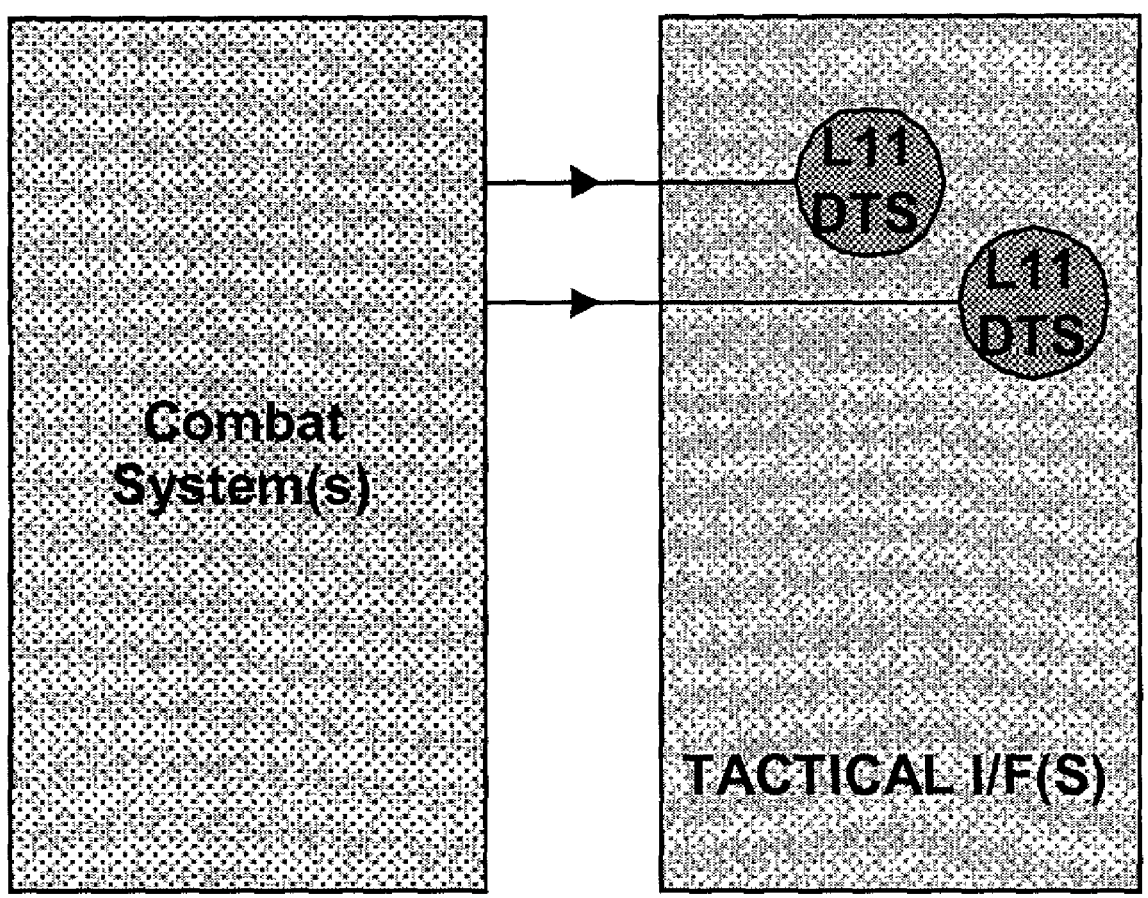
FIGS. 3a–3f represent the process steps from intrusion/compromise detection through adaptive response facilitated by the waveform agility.
Figure 3B:
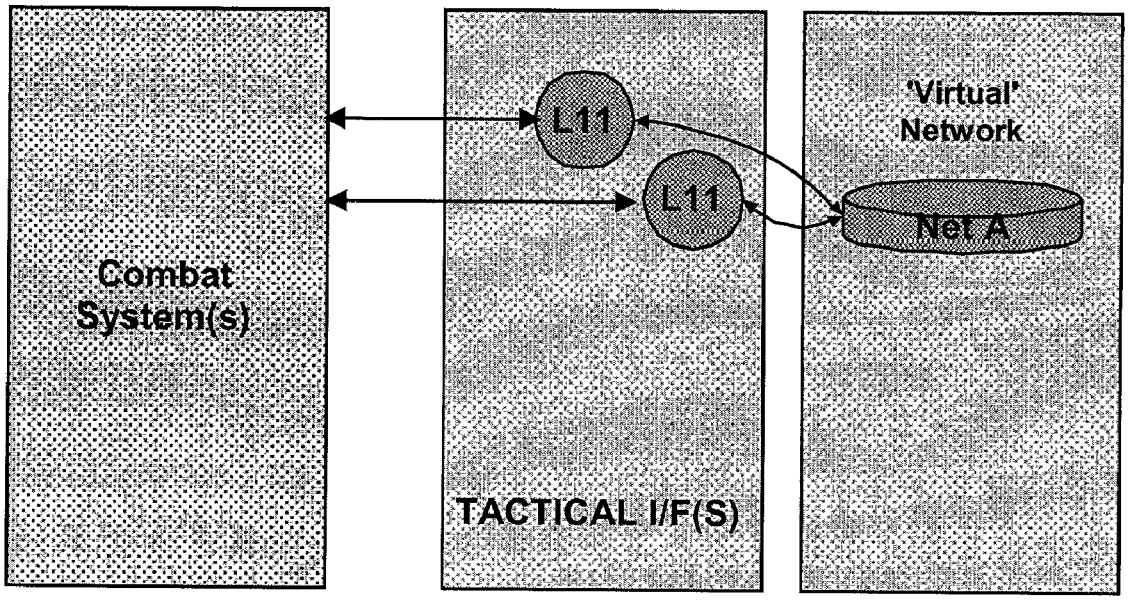
Figure 3C:
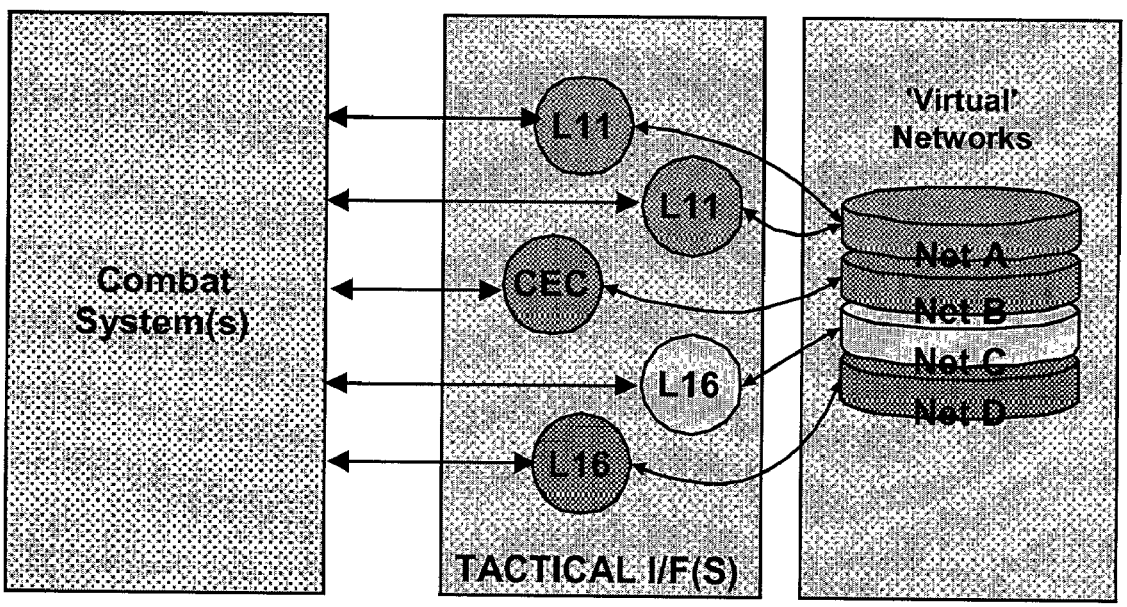
Figure 3D:
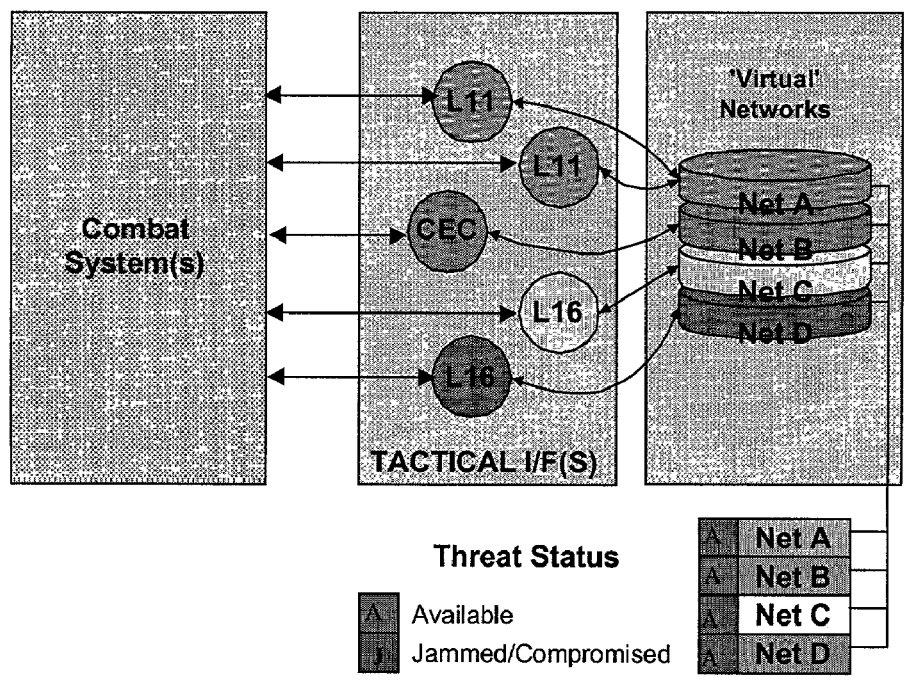

The series of drawings FIGS. 3a–3f represent a sequence of events intended to further articulate the representative Link-11/Link-16/CEC communications gateway scenario. FIG. 3a illustrates that two Link-11 communications channels are initially established and that Link-11 Data Terminal Sets (DTS) facilitates the end-user communications system. FIG. 3b depicts the establishment of a common virtual network that facilitates the exchange of information between the two Link-11 DTS's. In FIG. 3c new combat inputs (CEC and two Link-16 nodes) are established and added to the virtual environment. Virtual networks are established for each network type. FIG. 3d advances the illustration from FIG. 3c to incorporate the network threat assessment status provided by the individual network management systems 6 of FIG. 1 for each of the unique waveforms indicated. These waveform threat assessment summaries are rolled up to the Enterprise Network Management Tool 7 of FIG. 1.

Figure 3E:
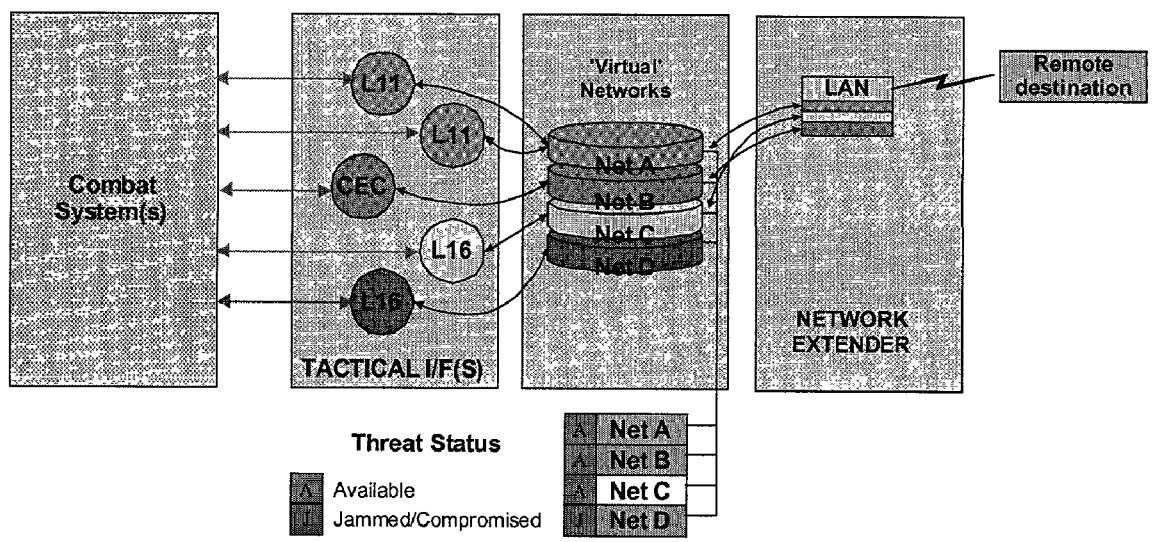
Figure 3F:
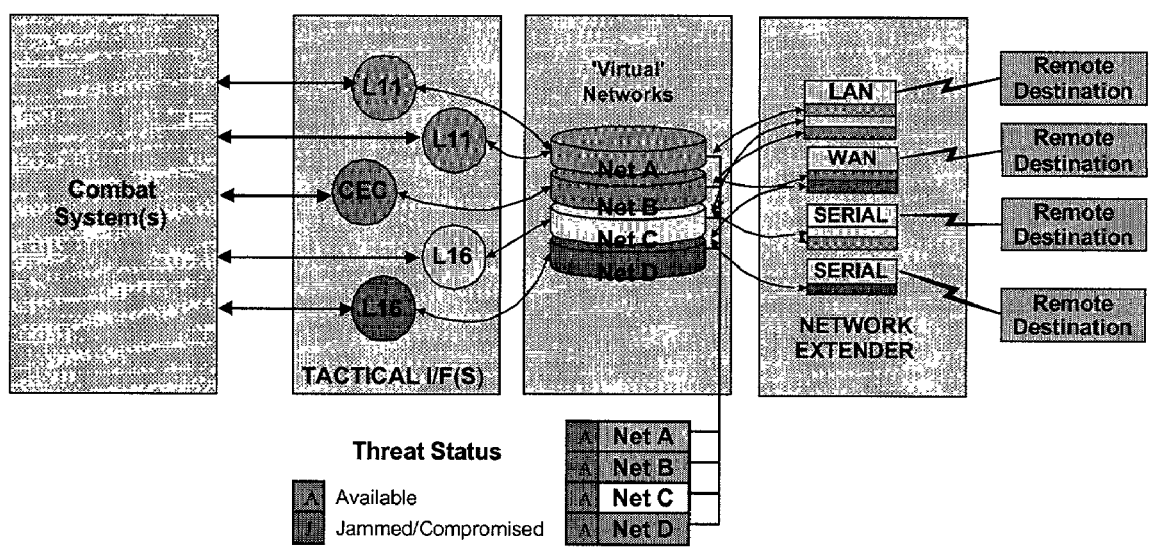

FIG. 3e advances the illustration from FIG. 3d to incorporate the "threat" condition on one of the Link-16 channels (Net D as indicated by its "J" status). Given that the status on the remaining links is "A" (thereby indicating its availability) the message can be: 1) translated to the appropriate Link-11 format and be re-routed via that link; 2) translated to the appropriate CEC format and be re-routed via that link; 3) rerouted without further translation to the other Link-16 link: 4) rerouted through other media cable of supporting traffic from any of the available networks. Lastly, FIG. 3f extends the illustration from FIG. 3e to reflect the expanded range of connectivity offered by the waveform agile communications methodology that the present invention represents. In this illustration, every available combat systems path or network extension path is available to serve any of the other waveforms supported by the software programmable radio. In waveform agile communications the entire communications network is available to support the transmission of any message across any of the available networks. The primary end benefit is that network availability is greatly enhanced and message throughput (e.g. transmission success) is assured (e.g. survivable) through waveform agile communications designed to operate continuously even while under Electronic or Information Warfare attack.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents that fall within the scope of the claims are intended to be embraced therein.

I claim:

1. A method for ensuring data availability for a plurality of radios through waveform agility, comprising the steps of:
   determining the threat states for each waveform supported on the radios;
   using the threat states to identify which channels are available for dynamic reassignment and which are not; and
   facilitating the transition of data from a compromised channel to an available channel, for subsequent transmission to the recipient, when service has been denied on the intended delivery path that has been compromised,
   wherein the step of determining the threat states includes communicating with the plurality of radios to advise the radios that a waveform has been compromised.

2. A method according to claim 1 wherein the radios are programmable and the format of the data on a compromised channel is converted to the format of data on an available channel.

3. A method according to claim 2 wherein the step of facilitating the transition of data from a compromised channel to an available channel includes a gateway that establishes a plurality of virtual networks for the programmable radios and is capable of transitioning a programmable radio from one virtual network to another.

4. A method according to claim 1 wherein the step of using the threat states to identify which channels are available for dynamic reassignment includes an enterprise network management tool that communicates the identity of the available channels and the compromised channels to the gateway.

5. A method according to claim 4 wherein the determined threat includes at least one threat selected from the following group of threats; noise jamming, net jamming, passive eavesdropping, or deceptive active transmissions.

6. A method according to claim 5 wherein noise jamming is characterized by either jamming noise or loss of communications services.

7. A method according to claim 5 wherein net jamming is characterized by appearance of unusually high traffic levels, duplicate participants or appearance of rogue units.

8. A method according to claim 5 wherein passive eavesdropping is characterized by duplicate participants, rogue units, excessive over the air rekeying requests, false synchronizations or cryptoseal failures.

9. A method according to claim 5 wherein deceptive active transmissions are characterized by appearance of uncharacteristically high traffic patterns, faulty header structures, incorrectly formatted data, negative acknowledgements or cryptoseal failures.

10. A method for ensuring data availability for a plurality of programmable radios through waveform agility, comprising the steps of:
- determining the threat states for each waveform supported on the programmable radios with an enterprise network management tool that communicates with the programmable radios to advise the programmable radios that a waveform has been compromised;
- using the threat states determined by the enterprise management tool to identify which channels are available for dynamic reassignment and which are not, and communicating the identity of the available channels and the compromised channels to a gateway; and
- facilitating the transition of data from a compromised channel to an available channel, via the gateway that establishes a plurality of virtual networks for the programmable radios and that transitions a programmable radio from one virtual network to another, when service has been denied on the intended delivery path that has been compromised;
- wherein the format of the data on a compromised channel is converted to the format of data on an available channel.

11. A network for ensuring data availability for programmable radios through waveform agility, comprising:
- a plurality of programmable radios each having a software core and each being capable of handling a plurality of different waveforms;
- an enterprise network management tool for determining the threat states for each waveform supported on the programmable radios, identifying which channels are available for dynamic reassignment and which are not and advising the programmable radios that a waveform has been compromised; and
- a gateway, that includes a plurality of virtual network for the programmable radios, for facilitating the transition of data from a compromised channel to an available channel, when service has been compromised on the intended delivery path to a programmable radio;
- wherein the format of the data on a compromised channel is converted to the format of data on an available channel.

12. A network according to claim 10 that further includes a plurality of link management systems for coupling the waveforms of the programmable radios to the gateway.

13. A network according to claim 11 wherein the gateway includes a human/computer interface, and at least a tactical interface for communicating with a tactical data link or a network interface for communicating with a data network.

14. A network according to claim 11 wherein the programmable radios are capable of operating over one or more legacy or future waveforms including but not limited to waveforms supporting the following group of data links, Link-11, Link-16, SADL, Link-22, EPLRS, SINCGARS.

15. A network according to claim 11 that further includes a hostile event correlator responsive to either the enterprise network management tool or the gateway for deriving or updating an electronic order of battle.

* * * * *

UNITED STATES PATENT AND TRADEMARK OFFICE
CERTIFICATE OF CORRECTION

PATENT NO. : 7,082,296 B2 Page 1 of 1
APPLICATION NO. : 10/125448
DATED : July 25, 2006
INVENTOR(S) : M. Paul Zavidniak It is certified that error appears in the above-identified patent and that said Letters Patent is hereby corrected as shown below:

Title Page, item (73) Assignee: change "Northrup Grumann Corporation" to --Northrop Grumman Corporation--.

Signed and Sealed this

Twenty-first Day of November, 2006

JON W. DUDAS
*Director of the United States Patent and Trademark Office*